Patented Jan. 31, 1933

1,895,977

UNITED STATES PATENT OFFICE

JOHN W. DRESSEL, OF GOLDENDALE, WASHINGTON

LIVER CONCENTRATE

No Drawing.    Application filed July 8, 1930. Serial No. 466,581.

This invention relates to improvements in medicinal foods compounded primarily for the treatment of anemia and pertains particularly to an improved liver concentrate and process of preparing the same.

The primary object of the present invention is to provide a process by means of which liver, particularly beef liver, may be obtained in concentrated form for use as a medicine, the preparation retaining all of the nutritive value of the fresh liver.

It is, of course, well known that liver contains certain of the vitamines essential to the proper growth and development of the human body but the percentage amount of these vitamines is relatively small so that it would be necessary for a person wishing to eat liver for its beneficial effects, to consume a relatively large amount of the same before an amount of the vitamines necessary to produce any appreciable results would be obtained.

In certain processes at present employed for making concentrated liver extract the liver is macerated with water and then with alcohol so that certain elements are removed therefrom, the remainder of the preparation being employed for its medicinal properties.

In the present case the valuable constituents of the liver are obtained in a dry form without the use of liquid solvents of any character, the only substance employed in carrying out the present process being common salt.

In carrying out the process the liver is first cut up into small pieces and placed in a cast iron vessel. The salt which is taken in the proportion of one ounce to each pound of liver, preferably beef liver, is then sprinkled over the cut up particles of the liver and the vessel is covered and allowed to stand for forty hours in a temperature of from fifty to fifty-five degrees Fahrenheit. The liver is then removed from the vessel and there will be found remaining therein a liquid which constitutes the valuable part of the liver which has been drawn therefrom by the salt. The solid particles of the liver are discarded and the remaining liquid is then subjected to an evaporating process. Before the liquid is evaporated it is removed from the first mentioned vessel into another cast iron vessel in which it is boiled or heated until all of the liquid has been dissipated when it will be found that there will be remaining in the vessel a solid substance which after being thoroughly dried is reduced to a fine powder by rolling. This dried powder constitutes the liver concentrate of the present invention and it may be administered in any suitable manner and in any quantities according to the needs of the individual.

Having thus described my invention, what I claim is:

1. The herein described process of preparing a liver concentrate, which consists in adding salt to fresh whole liver, then allowing the salt treated liver to stand for approximately forty hours in a temperature of from fifty to fifty-five degrees Fahrenheit, and finally removing the resulting liquid from the treated liver and evaporating the same until a dry residue is obtained.

2. The herein described process of preparing a liver concentrate, which consists in cutting up into small pieces fresh liver and placing the same in a suitable vessel, then covering the cut up liver with sodium chloride taken in the proportion of one ounce to each pound of the liver, then covering the vessel and allowing the salted liver to stand for approximately forty hours in a temperature of from fifty to fifty-five degrees Fahrenheit, then removing the solid particles and transferring the liquid extracted therefrom by the salt to another vessel, then subjecting the extracted liquid to the application of heat until a solid dry residue is obtained, and finally reducing the dry residue to a powder.

In testimony whereof I hereunto affix my signature.

JOHN W. DRESSEL.